United States Patent
Chang et al.

(10) Patent No.: US 11,204,163 B2
(45) Date of Patent: Dec. 21, 2021

(54) L-SHAPED HEADER OF STEAM GENERATOR INCLUDING SPIRAL TUBE AND A COUPLING STRUCTURE OF L-SHAPED HEADER AND TUBE

(71) Applicants: KOREA ATOMIC ENERGY RESEARCH INSTITUTE, Daejeon (KR); KING ABDULLAH CITY FOR ATOMIC AND RENEWABLE ENERGY, Riyadh (SA)

(72) Inventors: Seongmin Chang, Daejeon (KR); Kangheon Lee, Daejeon (KR); Yunbum Park, Daejeon (KR); Gyumahn Lee, Daejeon (KR); Jongwook Kim, Daejeon (KR); Kyeonghoon Jeong, Daejeon (KR); Jaeseon Lee, Daejeon (KR); Hanbum Surh, Seoul (KR); Kwanghyun Ahn, Daejeon (KR); Jinseok Park, Daejeon (KR); Keungkoo Kim, Daejeon (KR)

(73) Assignees: KOREA ATOMIC ENERGY RESEARCH INSTITUTE, Daejeon (KR); KING ABDULLAH CITY FOR ATOMIC AND RENEWABLE ENERGY, Riyadh (SA)

( * ) Notice: Subject to any disclaimer, the term of this patent is extended or adjusted under 35 U.S.C. 154(b) by 0 days.

(21) Appl. No.: 16/638,808

(22) PCT Filed: Aug. 16, 2018

(86) PCT No.: PCT/KR2018/009424
§ 371 (c)(1),
(2) Date: Feb. 13, 2020

(87) PCT Pub. No.: WO2019/035671
PCT Pub. Date: Feb. 21, 2019

(65) Prior Publication Data
US 2020/0363055 A1    Nov. 19, 2020

(30) Foreign Application Priority Data

Aug. 16, 2017    (KR) .......................... 10-2017-0103660

(51) Int. Cl.
   *F22B 37/22*    (2006.01)
   *F22B 37/00*    (2006.01)
   *G21D 1/00*    (2006.01)

(52) U.S. Cl.
   CPC ............ *F22B 37/22* (2013.01); *F22B 37/002* (2013.01); *F22B 37/221* (2013.01); *G21D 1/00* (2013.01)

(58) Field of Classification Search
   CPC .......... F22B 17/18; F22B 17/08; F22B 17/12; F22B 17/16; F22B 37/22; F22B 37/002; F22B 37/228
   See application file for complete search history.

(56) References Cited

U.S. PATENT DOCUMENTS 3,411,486 A * 11/1968 Cooper ................. F22B 37/227
                                                            122/476
4,009,751 A    3/1977 Zelnik
               (Continued)

FOREIGN PATENT DOCUMENTS

JP       H10-19488 A      1/1998
JP     2005321122 A * 11/2005
               (Continued)

OTHER PUBLICATIONS

International Search Report dated Dec. 18, 2018 issued in PCT/KR2018/009424.

*Primary Examiner* — Gregory A Wilson
(74) *Attorney, Agent, or Firm* — Scully Scott Murphy and Presser

(57) ABSTRACT

The present disclosure relates to an L-shaped header of a steam generator including a spiral heat transfer tube, and a
(Continued)

coupling structure between the L-shaped header and the heat transfer tube, wherein an upper end and a lower end of a heat transfer tube assembly configured with a plurality of heat transfer tubes are vertically formed, and the upper and lower ends of the heat transfer tube assembly are vertically coupled to a bottom side or a top side of the header. Therefore, the heat transfer tubes constituting the same concentric circle may use the heat transfer tubes formed with the same shape, thereby improving the manufacturability of parts and reducing the manufacturing cost.

13 Claims, 7 Drawing Sheets

(56) References Cited

U.S. PATENT DOCUMENTS

| | | |
|---|---|---|
| 4,644,906 A | 2/1987 | Garabedian |
| 9,897,308 B2 * | 2/2018 | Lobscheid ............ F22B 1/1838 |

FOREIGN PATENT DOCUMENTS

| | | |
|---|---|---|
| JP | 2017-503140 A | 1/2017 |
| KR | 2011-0019174 A | 2/2011 |
| KR | 10-1138560 B1 | 5/2012 |
| KR | 10-1188545 B1 | 10/2012 |

* cited by examiner

L-SHAPED HEADER OF STEAM GENERATOR INCLUDING SPIRAL TUBE AND A COUPLING STRUCTURE OF L-SHAPED HEADER AND TUBE

CROSS-REFERENCE TO RELATED APPLICATION

Pursuant to 35 U.S.C. § 119(a), this application claims the benefit of the earlier filing date and the right of priority to Korean Patent Applications No. 10-2017-0103660, filed on Aug. 16, 2018, the contents of which are incorporated by reference herein in their entirety.

BACKGROUND

1. Technical Field

The present disclosure relates to a header of a steam generator, and more particularly, to an L-shaped header of a steam generator using spiral heat transfer tubes connected to a feedwater nozzle and a steam nozzle in an integral reactor and a coupling structure between the header and the heat transfer tubes of the steam generator.

2. Description of the Related Art

At present, steam power cycles based on the Rankine cycle are now widely used in the fields of nuclear power generation, fuel gas/steam combined circulation and coal-fired power plants. The generation of high-temperature hot steam in these areas is the first step in converting thermal energy into power. At present, there are two types of facilities for generating steam, a natural circulation steam generator and a once-through steam generator. Compared to a natural circulation steam generator, a once-through steam generator may directly generate superheated steam, super-high pressure and supercritical steam, and has a higher power generation efficiency and a compact structure.

Depending on the different arrangements of heat receiving water tubes, once-through steam generators may be divided into two types, an straight type and a spiral type.

Here, a spiral type once-through steam generator has a relatively large total heat exchange area, but due to its structural characteristics, stress concentration phenomenon can be solved well and stretchability in space is good. In addition, spiral type once-through steam generators are widely used in reactor power generation and power fields.

A steam generator used in a commercial nuclear power plant is a recirculation U-tube type steam generator provided with U-shaped heat transfer tubes in a separation method connected to a reactor vessel through pipes in which high-temperature reactor coolant in a primary system flows an inner side of heat transfer tubes.

Unlike a commercial nuclear power plant, an integral reactor steam generator has a shape of a spiral type once-through steam generator in which a steam generator is built in the reactor vessel. Furthermore, the steam generator circulates secondary coolant to an inside of the heat transfer tube to perform a function of directly producing superheated steam by heat exchange with primary coolant flowing to an outside of the heat transfer tube and removing the residual heat of the primary system during a reactor cooling operation and accident.

The heat transfer tubes of the spiral type once-through steam generators used in the integral reactor are manufactured in a spiral shape and concentrically wrapped around the inner tubes and wound in several rows, and the heat transfer tubes constituting the adjacent rows are crossed with each other such that their winding directions are opposite to each other and connected to a feedwater and steam header of the steam generator. In other words, the heat transfer tubes has a structure in which a plurality of spirally formed heat transfer tubes are arranged in a winding shape, and the upper and lower portions thereof are respectively connected to the header.

PRIOR ART DOCUMENTS

[Patent Document] (Patent Document 0001) Korean Patent Publication No. 10-1188545 (Sep. 27, 2012)
[Patent Document] (Patent Document 0002) Korean Patent Publication No. 10-1138560 (Apr. 13, 2012)

SUMMARY

Due to a structure in which a header is connected to upper and lower sides of heat transfer tubes when the heat transfer tubes and the head are mutually connected subsequent to arranging the plurality of spiral shaped heat transfer tubes, the shapes of portions to which the heat transfer tubes and the heads are connected are all different from one another and thus all the heat transfer tubes are respectively manufactured and combined therewith, thereby causing difficulties in manufacture and high cost.

Accordingly, an object of the present disclosure is to provide an L-shaped header of a steam generator including spiral shaped heat transfer tubes capable of improving the manufacturability and assemblability of a plurality of heat transfer tubes and a header and a coupling structure between the L-shaped header and the heat transfer tubes.

In addition, another object of the present disclosure is to provide an L-shaped header of a steam generator including spiral heat transfer tubes capable of allowing the steam generator to be inspected during operation to reduce economic loss due to the shutdown of a nuclear power plant.

In order to accomplish the foregoing objectives, according to the present disclosure, there is provided an L-shaped header configured to connect a spiral heat transfer tube and a steam nozzle or feedwater nozzle, in a steam generator comprising spiral heat transfer tubes, wherein the header is formed in an L shape, and one ends of a plurality of heat transfer tubes formed vertically are arranged with a plurality of concentric circles to constitute a heat transfer tube assembly, and one end of the heat transfer tube assembly is vertically connected to a lower portion of the header, and the steam nozzle or feedwater nozzle is horizontally connected to one side portion of the header, and fluid flowing vertically through the heat transfer tube assembly is horizontally switched through the header to flow toward the steam nozzle or feedwater nozzle.

Furthermore, according to the present disclosure, one end portion of the vertically formed heat transfer tube may be vertically coupled to one side of the header.

The header may include a first tube plate member coupled to one end of a heat transfer tube assembly configured with a plurality of heat transfer tubes, a first cover member fixed to an opposite side of a side to which the one end of the heat transfer tube assembly is coupled in the first tube plate member, and fixed to the first tube plate member while forming a flow space of the fluid on the opposite side, and a nozzle connection member coupled to a side portion of the first tube plate member and the first cover member and connected to the steam nozzle or feedwater nozzle of a reactor vessel to communicate the flow space in a state where the first tube plate member and the first cover member are coupled to each other.

The first tube plate member may include a first tube portion formed in a cylindrical shape to insert one end of a plurality of heat transfer tubes arranged in a cylindrical shape thereto, a first plate portion configured to block an upper portion of the first tube portion, and formed with a plurality of insertion holes to which the end portions of the plurality of heat transfer tubes are respectively inserted and fixed thereto, and a first flange portion protruded upward from an edge of the first plate portion to form a flow space of the fluid above the first plate portion and open one side portion.

The plurality of insertion holes may be formed along a plurality of concentric circles to form the plurality of concentric circles having different diameters around the center of the first tube portion.

A plurality of heat transfer tubes inserted into and coupled to the plurality of insertion holes forming one concentric circle among the plurality of concentric circles may be formed in the same shape.

The first cover member may be welded and fixed to an upper end of the first flange portion to form an opening corresponding to an opening of the first flange portion formed on a side portion thereof so as to form an access port through which the fluid flows into and out of the side portion thereof.

The nozzle connection member may be welded and fixed to an access port formed by coupling between the first tube plate member and the first cover member, and a diameter of a portion coupled to the access port may be formed to be larger than that of a portion connected to a side of the steam nozzle or feedwater nozzle.

Advantageous Effects

According to the header coupling structure of the steam generator using the spiral heat transfer tube according to an embodiment of the present disclosure, the heat transfer tubes arranged in the same concentric circle and formed in the same shape may be used, whereas the plurality of heat transfer tubes used in the related art are formed differently, thereby improving the manufacturability of parts and reducing the manufacturing cost.

Though the present disclosure has been described with reference to embodiments illustrated with reference to the drawings, the foregoing embodiment are merely illustrative, and it should to be understood that various modifications and other equivalent embodiments thereof can be made by those skilled in the art. Accordingly, the true technical protective scope of the present disclosure should be determined by the following claims.

According to the present disclosure, the heat transfer tubes arranged in the shape of a plurality of concentric circles may use the heat transfer tubes having the same shape for each column, thereby improving the manufacturability.

As a result, it may be possible to reduce the manufacturing cost of the spiral steam generator of the integral reactor and reducing the manufacturing period thereof.

In addition, the header may be formed to be smaller than an outer diameter of the heat transfer tube assembly formed in a cylindrical shape, thereby having an effect that can be used in a limited space.

As a result, it may be possible to facilitate inspection during the operation of the nuclear power plant so as to reduce the inspection period, and reduce the cost loss due to the shutdown of the nuclear power plant.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

The accompanying drawings in the present disclosure may be illustrated in exaggerated expression for distinctiveness, clarity and ease of understanding of the art from the related art. In addition, since the terms described below are defined in consideration of functions in the present disclosure, they may vary depending on the intention of the user or operator or the custom, and therefore the definition of these terms will be provided based on the technical content throughout this specification. On the other hand, the embodiments are merely examples of the constituent elements disclosed in the claims of the present disclosure and do not limit the scope of the present disclosure, and the scope of the right should be interpreted based on technical concepts throughout the specification of the present disclosure.

It will be understood that although the terms first, second, etc. may be used herein to describe various elements, these elements should not be limited by these terms. The terms are used merely for the purpose of distinguishing one element from another element, or distinguishing one element from the same element of another embodiment.

First, a first embodiment which will be described later with reference to FIGS. 1 and 2, a coupling structure between a part of a spiral heat transfer tube and a header of a steam generator is schematically illustrated for the sake of simplicity of the present disclosure, but coupling types between the heat transfer tube and the header may be exhibited in various ways according to the design of a reactor.

Figure 1:
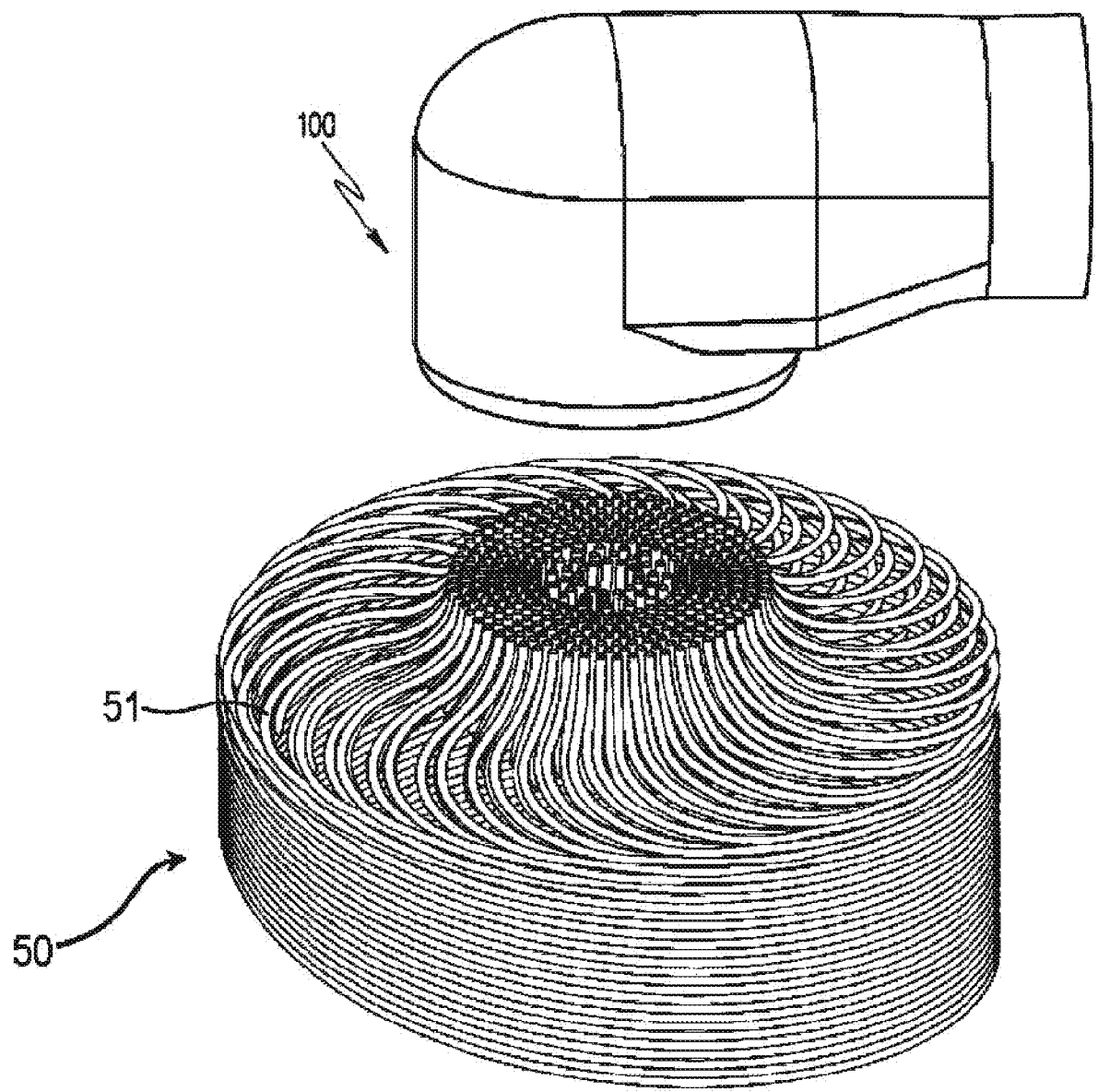
FIG. 1 is a perspective view illustrating a header coupling structure of a steam generator using spiral heat transfer tubes according to a first embodiment of the present invention.
Figure 2:
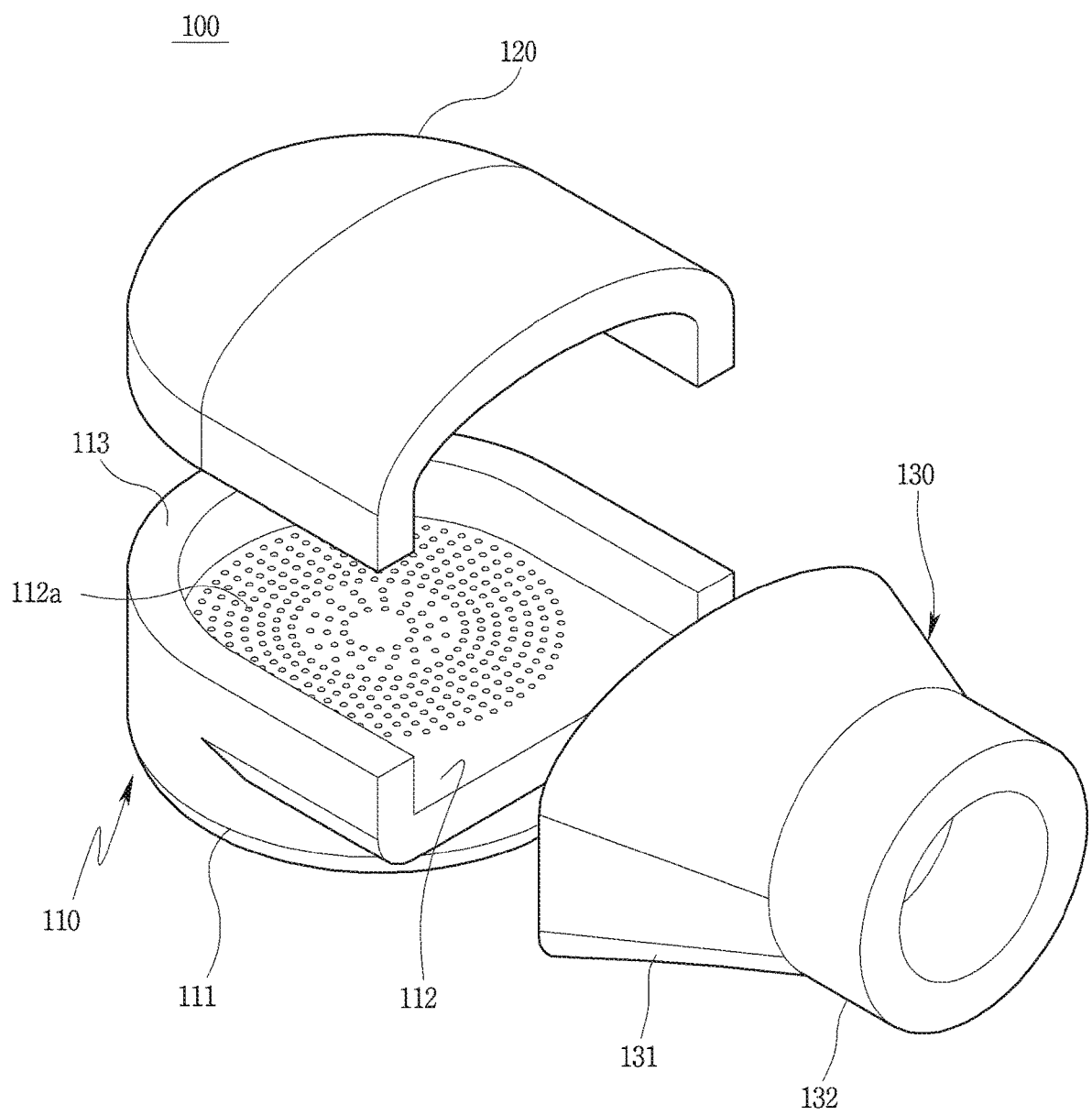
FIG. 2 is an exploded perspective view illustrating a header in a header coupling structure of a steam generator using spiral heat transfer tubes according to a first embodiment of the present invention.

FIG. 1 is a perspective view illustrating a header coupling structure of a steam generator using spiral heat transfer tubes according to a first embodiment of the present disclosure, and FIG. 2 is an exploded perspective view illustrating a header in a steam generator using spiral heat transfer tubes according to an embodiment of the present disclosure.

Figure 3:
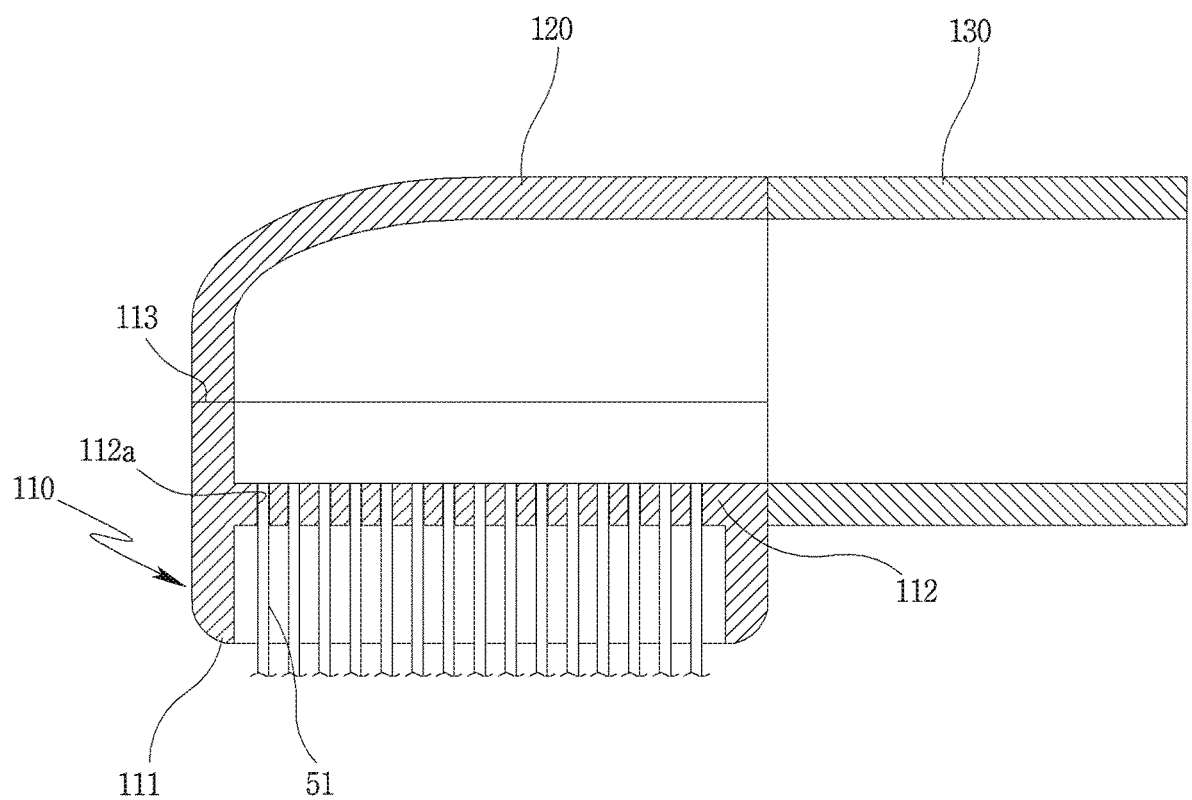
FIG. 3 is a cross-sectional view illustrating a header coupling structure of a steam generator using spiral heat transfer tubes according to a first embodiment of the present invention.
Figure 4:
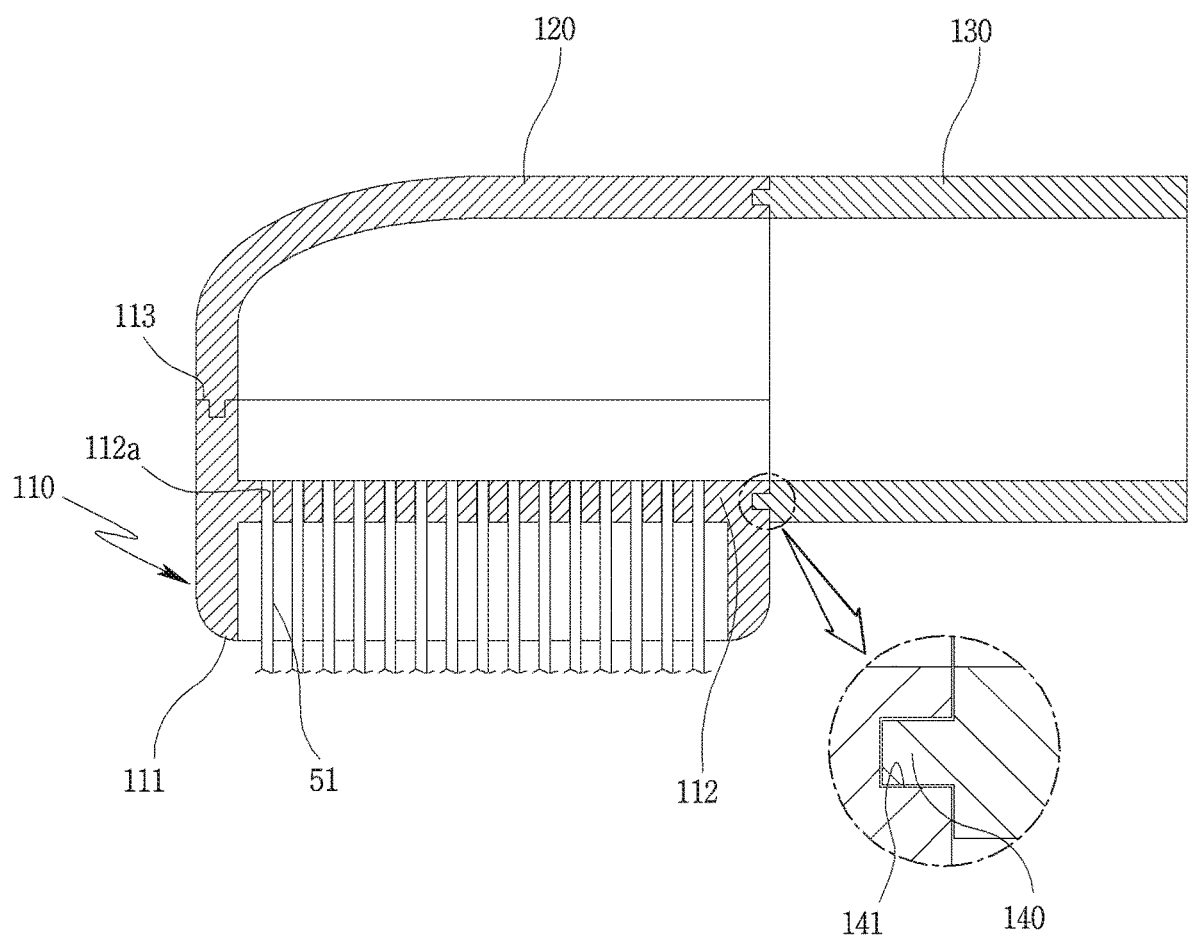
FIG. 4 is a cross-sectional view illustrating another type of a header coupling structure of a steam generator using spiral heat transfer tubes according to a first embodiment of the present invention.

FIG. 3 is a cross-sectional view illustrating a header coupling structure in a steam generator using spiral heat transfer tubes according to an embodiment of the present invention, and FIG. 4 is a cross-sectional view illustrating another type of a header coupling structure of a steam generator using spiral heat transfer tubes according to a first embodiment of the present invention.

First, in the steam generator, a plurality of heat transfer tubes constituting a heat transfer tube assembly are wound and arranged in a spiral shape, reactor coolant heated by the core flows to an outside of the heat transfer tube assembly, and secondary coolant flows to an inside of the plurality of heat transfer tubes. Furthermore, the secondary coolant is heated by the heat of the high-temperature and high-pressure reactor coolant to produce steam.

Here, the detailed technical configuration of an integral reactor steam generator can be understood from well-known technologies, and is not a gist of the present disclosure, and thus the detailed description and drawings thereof will be omitted.

First, referring to FIG. 1, an L-shaped header 100 of a steam generator using spiral heat transfer tubes according to a first embodiment of the present disclosure has a structure in which one vertically formed end (upper or lower end) is vertically inserted downward and connected to one end of a heat transfer tube assembly 50 configured with a plurality of heat transfer tubes 51 arranged with a plurality of concentric circles, and a nozzle (steam nozzle or feedwater nozzle) is horizontally connected to one side portion thereof to allow fluid vertically flowing through the heat transfer tube assembly 50 to be horizontally switched to flow toward the steam nozzle or the feedwater nozzle.

In other words, the L-shaped header 100 of the steam generator according to an embodiment of the present disclosure has a structure formed in an L-shape in which the direction of fluid is switched from a vertical direction to a horizontal direction fluid to allow fluid flowing through the heat transfer tube assembly 50 arranged vertically to flow toward the steam nozzle or feedwater nozzle provided in a horizontal direction.

Referring to FIGS. 2 through 4, a header coupling structure of a steam generator using spiral heat transfer tubes according to a first embodiment of the present disclosure is configured such that one end (upper and lower ends) of the heat transfer tube assembly 50 including a plurality of heat transfer tubes 51 formed in a spiral shape and arranged at regular intervals in a circumferential direction is vertically formed and one end (upper end or lower end) of the heat transfer tube assembly 50 is respectively welded and fixed vertically to the header 100.

Here, one end of the heat transfer tube assembly refers to an upper or lower end of the vertically disposed heat transfer tube assembly, and one end of the heat transfer tube formed in a spiral shape is vertically formed. Accordingly, only one of the upper and lower ends of the heat transfer tube may be formed vertically, or both the upper and lower ends thereof may be formed vertically.

First, the heat transfer tube 51 is formed in a spiral shape like a screw thread from the upper portion to the lower portion, and formed so that one end (upper end or lower end) is vertically fixed in a standing manner to the header 100 in a horizontal state. Accordingly, for the heat transfer tube assembly 50, a plurality of heat transfer tubes 51 are arranged at intervals of a predetermined angle in a circumferential direction and formed in a cylindrical shape.

The header 100 is coupled to one end of the heat transfer tube assembly 50 and connected to a steam nozzle or a feedwater nozzle, and configured to include a first tube plate member (first tube plate, first tube sheet, or first tube sheet member) 110 to which one end of the heat transfer tube assembly 50 is welded, a first cover member 120, and a nozzle connection member 130. (Refer to FIG. 2)

The first tube plate member 110 is welded and fixed to one end of the heat transfer tube assembly 50, and formed in a cylindrical shape having a diameter smaller than an outer diameter of the heat transfer tube assembly 50.

The first tube plate member 110 is configured with a first tube portion 111 into which an upper end of the heat transfer tube assembly 50 is inserted in a state where one end of the plurality of heat transfer tubes 51 is formed in a circular shape.

A first plate portion 112 having a flat surface is integrally formed on the first tube portion 111 of the first tube plate member 110 to cover an upper portion of the first tube portion 111.

A plurality of insertion holes 112a to which one end of the plurality of heat transfer tubes 51 is inserted and welded are formed on the first plate portion 112 of the first tube plate member 110.

A first flange portion 113 coupled to a first cover member 120 which will be described later is formed in a protruding manner to form a space through which fluid flowing through one end of the plurality of heat transfer tubes 51 flows at an upper surface edge of the first plate portion 112 of the first tube plate member 110.

At this time, the first flange portion 113 is not formed on one side portion of the upper surface edge of the first plate portion 112 such that the header 100 forms an opening through which the fluid flows to the steam nozzle or feedwater nozzle.

On the other hand, a plurality of insertion holes 112a into which one end of the plurality of heat transfer tubes 51 inserted at a lower side of a the first tube portion 111 having a tubular shape is inserted formed on the first plate portion 112. The plurality of insertion holes 112a are formed to have the same size so that any one of the plurality of heat transfer tubes 51 can be inserted when one end of each of the plurality of heat transfer tubes 51 is inserted. Of course, all of the plurality of heat transfer tubes 51 are preferably formed to have the same diameter.

Here, when the center of the first tube portion 111 is a central portion, a plurality of concentric circles having different diameters are formed around the central portion, and the insertion holes 112a are formed along the plurality of concentric circles.

The plurality of heat transfer tubes 51 inserted into and coupled to the plurality of insertion holes 112a forming one concentric circle among the plurality of concentric circles are formed in the same shape. In other words, the heat transfer tubes 51 inserted into the insertion holes 112a forming respective concentric circles among the plurality of concentric circles are formed in different shapes, and only the heat transfer tubes 51 inserted into the plurality of insertion holes 112a forming one concentric circle are formed in the same shape.

The first cover member 120 is fixed to the first tube plate member 110 on an opposite side to which one end of the heat transfer tube assembly 50 is coupled, and fixed to the first tube plate member 110 to have a flow space on the opposite side of the heat transfer tube assembly 50.

The first cover member 120 covers an upper portion of the first plate portion 112 to form a flow space, and is formed in a dome shape having one side open, and a lower end thereof is formed in a shape corresponding to an upper end of the first flange portion 113 of the first plate portion 112.

The opening of the first cover member 120 is formed at the same position as an opening formed on the first flange portion 113 of the first plate portion 112, thereby forming an access port through which the fluid flows into and out of the steam nozzle or feedwater nozzle along with the opening of the first flange portion 113.

The first nozzle connection member 130 is coupled to the first cover member 120 and the access port formed by the first flange portion 113 of the first plate portion 112 to connect the header 100 to a side of the steam nozzle or feedwater nozzle.

The first nozzle connection member 130 is formed in a pipe shape, and configured with one end portion brought into contact with and coupled to the first cover member 120 and the access port formed by the first plate portion 112, and the other end portion connected to a side of the steam nozzle or feedwater nozzle.

The first nozzle connection member 130 may be formed in a funnel shape in which one end portion (first portion 131) coupled to the first cover member 120 and the access port of the first tube plate member 110 having a diameter larger than that of the other end portion (second portion 132) connected to a side of the steam nozzle or the feedwater nozzle.

On the other hand, as illustrated in FIG. 4, between an upper end of the first flange portion 113 of the first tube plate member 110 and a lower end of the first cover member 120, a fitting protrusion 140 and a fitting groove portion 141 for preventing the lower end of the first cover member 113 from slipping in a state in which the lower end of the first cover member 113 is in close contact with the upper end of the first flange portion 113 to weld and fix the lower end of the first cover member 120 to the upper end of the first flange portion 113.

Furthermore, the fitting protrusion 140 and the fitting groove portion 141 for preventing the first nozzle connection member 130 in close contact with the access port when the first nozzle connection member 130 is welded and fixed to the access port from slipping is formed between one end portion of the first nozzle connection member 130 and the access port formed by an opening of the first flange portion 113 and an opening of the first cover member 120.

Here, when the fitting protrusion 140 is formed at an upper end of the flange portion 113 and at one end portion of the first nozzle connection member 130, the fitting groove portion 141 is formed at the lower end of the first cover member 120 and at the access port, and when the fitting protrusion 140 is formed at a lower end of the first cover member 120 and at the access port, the fitting groove portion 141 is formed at an upper end of the first flange portion 113 and one end portion of the first nozzle connection member 130.

Figure 5:
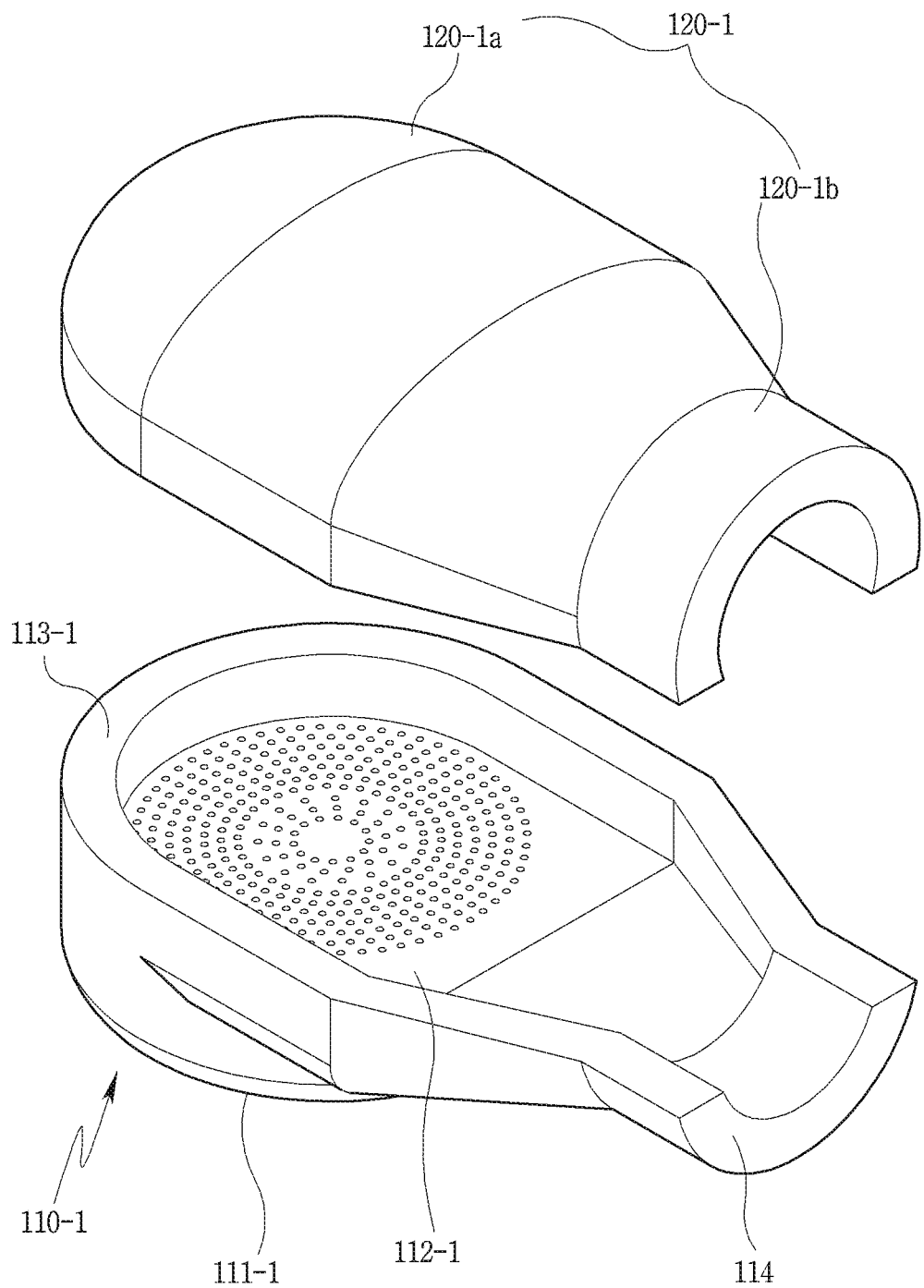
FIG. 5 is an exploded perspective view illustrating an L-shaped steam generator header and a header of a heat transfer tube coupling structure using spiral heat transfer tubes according to a second embodiment of the present disclosure.

FIG. 5 is an exploded perspective view illustrating an L-shaped steam generator header and a header of a heat transfer tube coupling structure using spiral heat transfer tubes according to a second embodiment of the present disclosure.

Referring to FIG. 5, a header coupling structure of a steam generator using spiral heat transfer tubes according to a second embodiment of the present disclosure is configured such that one end of the heat transfer tube assembly 50 including a plurality of heat transfer tubes 51 formed in a spiral shape and arranged at regular intervals in a circumferential direction is vertically formed and one end of the heat transfer tube assembly 50 is respectively welded and fixed vertically to the header 100.

The header 100 includes a second plate member 110-1 having a space at an upper portion thereof and one end of a plurality of heat conductive pipes 51 fitted to the lower portion of the header plate 100, And a second cover member 120-1 that forms a fluid flow space and forms a nozzle connection portion to which a steam nozzle or a feedwater nozzle is connected.

The second tube plate member (second tube plate, second tube sheet, or second tube sheet member) 110-1 includes a second tube portion 111-1 formed in a cylindrical shape into which one end of the plurality of heat transfer tubes 51 is inserted, a second plate portion 112-1 formed with a plurality of insertion holes 112a through which one end of the plurality of heat transfer tube 51 is inserted and fixed while blocking an upper portion of the second tub portion 111-1, a first extension portion 114 extended to one side of the second plate portion 112-1 to form a nozzle connection portion, and a second flange portion 113-1 protruded at an upper edge portion of the second plate portion 112-1 and the first extension portion 114 to form a flow space at an upper portion of the second plate portion 112-1 and the first extension portion 114 and open an end of the first extension portion 114.

The second plate portion 112-1 is also formed with a plurality of insertion holes 112a into which one end of the plurality of heat transfer tubes 51 inserted into a lower side of the second tube portion 111-1 formed in a tubular shape is inserted, similarly to the first plat portion 112. It is the same structure as the insertion hole 112a formed on the first plate portion 112, and thus the detailed description thereof will be omitted.

Here, the first extension portion 114 is formed in a shape that a pipe is cut in a length direction together with a part of the second flange portion 113-1, and extends to one side portion of the second plate portion 112-1.

The second cover member 120-1 covers an upper portion of the second plate portion 112-1 to form a flow space of the fluid, and includes a dome portion 120-1a coupled to an upper end of the second flange portion 113-1 formed at an edge of the second plate portion 112-1 to form a flow space, and a second extension portion 120-1b extended to one side (a side of the steam nozzle or feedwater nozzle) of the dome portion 120-1a and coupled to the first extension portion 114 to form a nozzle connection portion.

Figure 6:
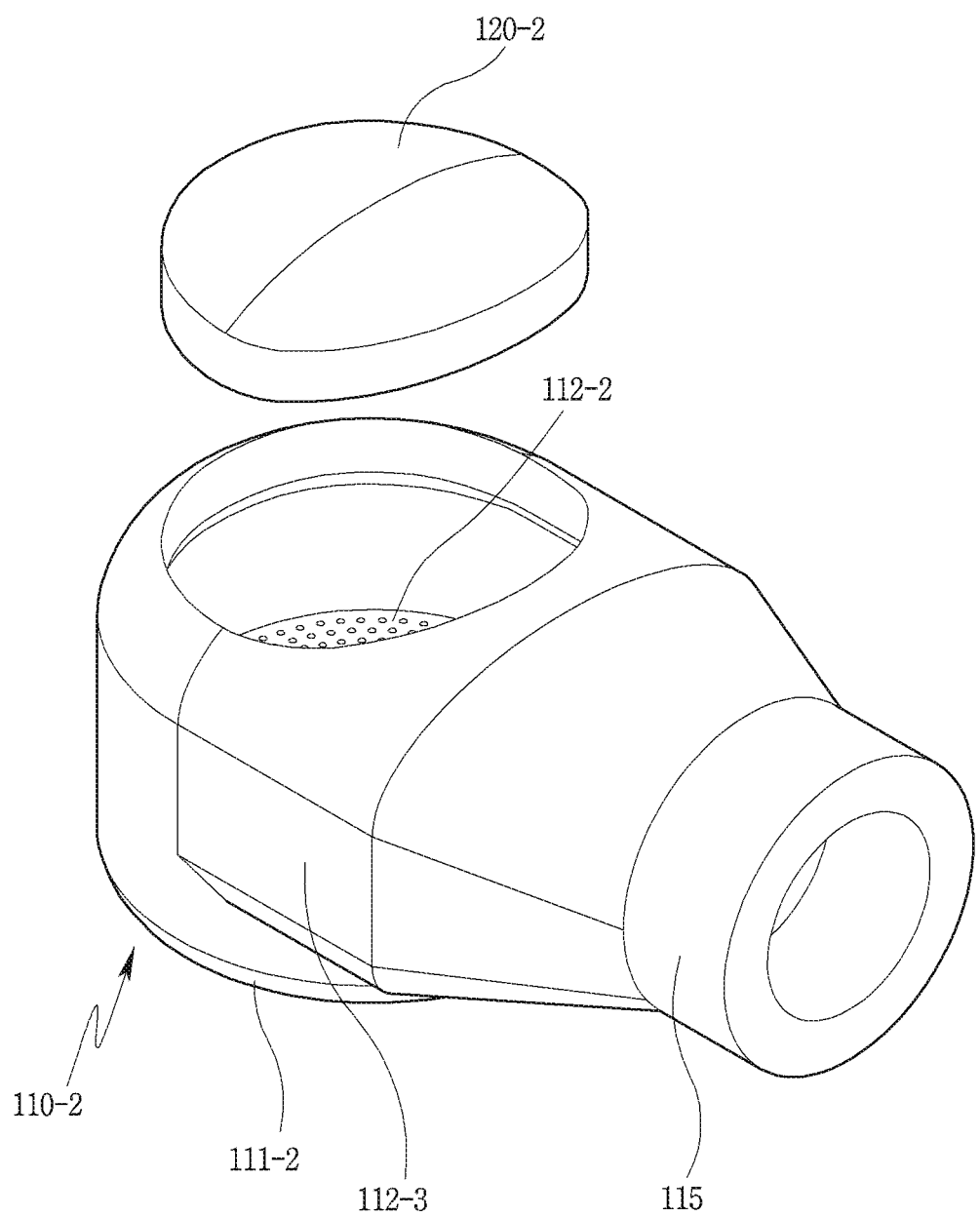
FIG. 6 is an exploded perspective view illustrating an L-shaped steam generator header and a header of a heat transfer tube coupling structure using spiral heat transfer tubes according to a third embodiment of the present disclosure.

FIG. 6 is an exploded perspective view illustrating an L-shaped steam generator header and a header of a heat transfer tube coupling structure using spiral heat transfer tubes according to a third embodiment of the present disclosure.

Referring to FIG. 6, a header coupling structure of a steam generator using spiral heat transfer tubes according to a second embodiment of the present disclosure is configured such that one end (upper or lower end) of the heat transfer tube assembly 50 including a plurality of heat transfer tubes 51 formed in a spiral shape and arranged at regular intervals in a circumferential direction is vertically formed and one end of the heat transfer tube assembly 50 is welded and fixed vertically to the header 100.

The header 110 includes a third tube plate member (third tube plate, third tube sheet, or third tube sheet member) 110-2 in which one end of the plurality of heat transfer tubes 51 is inserted into and coupled to a lower portion thereof and one side portion thereof is connected to the steam nozzle or feedwater nozzle while a flow space of the fluid is formed at an upper portion thereof, and the upper portion thereof is open to weld and fix one end of the heat transfer tube 51, and a third cover member 120-2 for covering an upper opening of the third tube plate member 110-2.

The third tube plate member 110-2 includes a cylindrically shaped third tube portion 111-2 into which one end of the plurality of heat transfer tubes 51 is inserted, a third plate portion 112-2 configured to block an upper portion of the third tube portion 111-2 and formed with a plurality of insertion holes 112*a* into which one end of the plurality of heat transfer tubes 51 is inserted and fixed, a third flange portion 112-2 protruded in a dome shape from an edge of the third plate portion 112-2 to form a fluid flow space above the third plate portion 112-2 and forming an opening at an upper portion thereof, and a nozzle connection portion 115 extended in a pipe shape to one open side portion of the third plate portion 112-2 and connected to the steam nozzle or feedwater nozzle.

The opening formed at an upper portion of the third plate portion 112-2 is formed in a circular hole to work when the heat transfer tube 51 inserted into the insertion hole 112*a* is fixed by welding.

The third cover member 120-2 is welded and fixed to a circular opening formed at an upper portion of the third plate portion 112-2.

Figure 7:
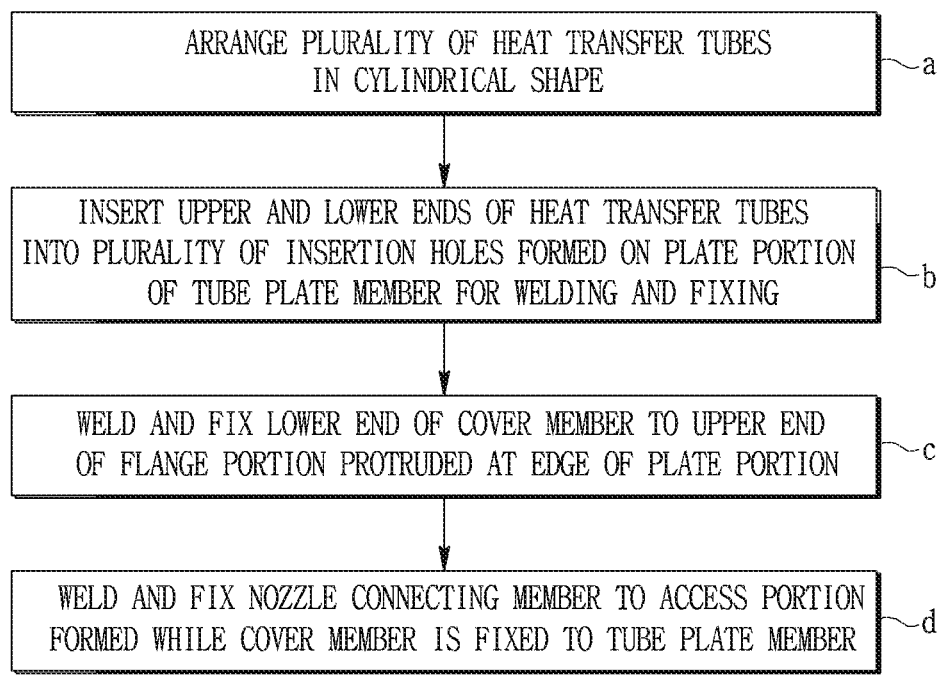
FIG. 7 is a view illustrating a header coupling process of a steam generator using spiral heat transfer tubes according to a first embodiment of the present invention.

FIG. 7 is a view illustrating a header coupling process in a steam generator using spiral heat transfer tubes according to an embodiment of the present invention.

Hereinafter, a header coupling method of a steam generator using a spiral heat transfer tube according to an embodiment of the present disclosure will be described.

Here, prior to coupling the header 100 to the heat transfer tube 51, the plurality of heat transfer tubes 51 formed in a spiral shape should be provided, and the first tube plate member 110, the first cover member 120, and the nozzle connection member 130 constituting the header 100 should be provided, respectively.

First, the header coupling method has a heat transfer tube arrangement step of arranging a plurality of heat transfer tubes 51 in a cylindrical shape. (a)

The heat transfer tube arrangement step (a) arranges the plurality of heat transfer tubes 51 in a cylindrical shape, and arranges the upper ends of the plurality of heat transfer tubes 51 to be inserted into and coupled to the plurality of insertion holes 112*a* formed on the first plate portion 112 of the first tube plate member 110.

Then, the header coupling method has a tube plate member coupling step of coupling the first tube plate member 110 to the upper ends of the plurality of heat transfer tubes 51 arranged in a cylindrical shape. (b)

The tube plate member coupling step (b) allows the upper ends of the plurality of heat transfer tubes 51 to be inserted into and coupled to the plurality of insertion holes 112*a*, respectively, formed on the first plate portion 112 of the first tube plate member 110.

At this time, the upper ends of the heat transfer tube 51 are inserted into the plurality of insertion holes 112*a* so as not to be protruded above the first plate portion 112 but to be located at the same position as an upper surface of the first plate portion 112.

Then, the header coupling method has a welding step of fixing the upper ends of the plurality of heat transfer tubes 51 inserted into the insertion holes 112*a* of the first plate portion 112 of the first tube plate member 110 to the first plate portion 112 by welding.

The welding step is to completely fix the upper ends of the plurality of heat transfer tubes 51 inserted in the insertion holes 112*a*, respectively, of the first plate portion 112 to the first plate portion 112, wherein an upper end circumference of the heat transfer tubes 51 is fixed to an upper edge of the insertion hole 112*a* by welding.

Then, the head coupling method has a cover member fixing step of covering, welding and fixing the first cover member 120 to an upper end of the first tube plate member 110. (c)

The cover member fixing step (c) allows an upper end of the first flange portion 113 of the first plate portion 112 to be aligned to a lower end of the first cover member 120 in the first tube plate member 110, and fixes the upper end of the first flange portion 113 to the lower end of the first cover member 120 by welding.

Then, the head coupling method has a nozzle connection member fixing step of allowing the nozzle connection member 130 to be brought into close contact with the access port formed by coupling the first tube plate member 110 to the first cover member 120, and then fixed thereto by welding. (d)

The nozzle connection member fixing step (d) allows an end portion having a large diameter portion to be brought into close contact with the access port and fixed temporarily and then welded and fixed thereto when the nozzle connection member 130 formed in a funnel shape is brought into close contact with the access port.

The present disclosure will not be limited the configurations and methods according to the above-described embodiments, and all or part of each embodiment may be selectively combined and configured to make various modifications thereto. For instance, even in one steam generator, a header connected to a steam nozzle and a header connected to a feedwater nozzle may be headers described in different embodiments.

REFERENCE SIGNS LIST

50: Heat transfer tube assembly 51: Heat transfer tube
100: Header
110: First tube plate member
110-1; Second tube plate member
110-2: Third tube plate member
111: First tube portion
111-1: Second tube portion
111-2: Third tube portion
112: First plate portion
112-1: Second plate portion
112-2: Third plate portion
112*a*: Insertion hole
113: First flange portion
113-1: Second flange portion
114: First extension portion
115: Nozzle connection portion
120: First cover member
120-1: Second cover member
120-1*a*: Dome portion
120-1*b*: Second extension portion 120-2: Third cover member
130: Nozzle connection member
140: Fitting protrusion
141: Fitting groove

INDUSTRIAL APPLICABILITY

The present invention is applicable to industries related to steam generators

What is claimed is:

1. A steam generator, comprising:
    a heat transfer tube assembly having a plurality of spiral heat transfer tubes arranged on a concentric circle; and
    a header formed to connect the heat transfer tube assembly and a nozzle,
    wherein one end of each of the plurality of spiral heat transfer tubes is extended in a vertical direction to form one end of the heat transfer tube assembly, and
    the header is disposed on an upper or lower side of the heat transfer tube assembly to be connected to one end of the heat transfer tube assembly along a vertical direction, and
    the header is connected along a horizontal direction to the nozzle disposed at one side of the header, and
    the header has an L-shape to switch the flow direction of fluid flowing in a vertical direction through one end of the heat transfer tube assembly to a horizontal direction so as to flow to the nozzle,
    wherein the header comprises:
    a tube plate member coupled to one end of the heat transfer tube assembly;
    a cover member fixed to an opposite side to a side to which one end of the heat transfer tube assembly is coupled in the tube plate member, and connected to an edge of the tube plate member to form a fluid flow space between the tube plate member and the cover member; and
    a nozzle connection member coupled to a side portion of the tube plate member and a side portion of the cover member to communicate with the flow space formed by the tube plate member and the cover member, and connected to the nozzle.

2. The steam generator of claim 1, wherein one end of the heat transfer tube assembly is inserted into the header along a vertical direction and connected to the header.

3. The steam generator of claim 1, wherein the tube plate member comprises:
    a tube portion formed in a cylindrical shape to surround one end of the heat transfer tube assembly;
    a plate portion having a plurality of insertion holes formed to block an upper portion of the tube portion, and formed to be forcibly inserted and coupled to one end of each of the plurality of spiral heat transfer tubes; and
    a flange portion protruded upward from an edge of the plate portion and coupled to the cover member to form the flow space above the plate portion.

4. The steam generator of claim 3, wherein at least one of the tube plate member, the cover member, and the nozzle connection member has a fitting protrusion protruded from one surface thereof, and
    a counterpart coupled to at least one of the tube plate member, the cover member, and the nozzle connection member has a fitting groove portion formed to accommodate the fitting protrusion, and
    the fitting protrusion is inserted into the fitting groove portion to fix a relative position between the at least one and the counterpart.

5. The steam generator of claim 3, wherein the cover member is fixed to an upper end of the flange portion, and
    one side of the cover member and one side of the flange portion are open to form a fluid access port for allowing the flow space to communicate with an inner space of the nozzle connection member.

6. The steam generator of claim 3, wherein the plurality of insertion holes are formed at positions spaced apart from each other along a plurality of concentric circles around the center of the tube portion.

7. The steam generator of claim 6, wherein a plurality of spiral heat transfer tubes being forcibly inserted and coupled to a plurality of insertion holes formed along any one of the plurality of concentric circles are formed in the same shape as each other.

8. The steam generator of claim 1, wherein the nozzle connection member is welded and coupled to a circumference of a fluid access port formed by coupling between the tube plate member and the cover member, and
    the nozzle connection member comprises:
    a first portion coupled to a circumference of the access port; and
    a second portion connected to the nozzle, and
    a diameter of the first portion is greater than that of the second portion.

9. The steam generator of claim 1, wherein:
    one side of the tube plate member and one side of the cover member form the nozzle connection portion connected to the nozzle.

10. The steam generator of claim 9, wherein the tube plate member comprises:
    a tube portion formed in a cylindrical shape to surround one end of the heat transfer tube assembly;
    a plate portion having a plurality of insertion holes formed to block an upper portion of the tube portion, and formed to be forcibly inserted and coupled to one end of each of the plurality of spiral heat transfer tubes;
    a flange portion protruded upward from an edge of the plate portion and coupled to the cover member to form the flow space above the plate portion; and
    a first extension portion protruded from one side of the plate portion and one side of the flange portion to form a lower portion of the nozzle connection portion.

11. The steam generator of claim 10, wherein the cover member comprises:
    a dome portion fixed to an upper end of the flange portion to form the flow space; and
    a second extension portion protruded from one side of the dome portion to form an upper portion of the nozzle connection portion, and
    the first extension portion and the second extension portion are coupled to each other to form an inner space communicating with the flow space.

12. The steam generator of claim 1, wherein the header comprises:
    the tube plate member having an open upper portion; and
    the cover member formed to cover the open upper portion of the tube plate member, and
    one end of each of the plurality of spiral heat transfer tubes is inserted and coupled to a lower portion of the tube plate member, and
    the fluid flow space is formed inside the tube plate member, and
    one side of the tube plate member is connected to the nozzle.

13. The steam generator of claim 12, wherein the tube plate member comprises:

a tube portion formed in a cylindrical shape to surround one end of the heat transfer tube assembly;

a plate portion having a plurality of insertion holes formed to block an upper portion of the tube portion, and formed to be forcibly inserted and coupled to one end of each of the plurality of spiral heat transfer tubes;

a flange portion protruded in a dome shape from an edge of the plate portion to form the flow space above the plate portion, and form an opening portion at an upper portion thereof; and the nozzle connection portion protruded in a pipe shape from one side of the plate portion and one side of the flange portion and connected to the nozzle.

* * * * *